P. D. BECKWITH.
Grain-Drill.
No. 40,597. Patented Nov. 17, 1863
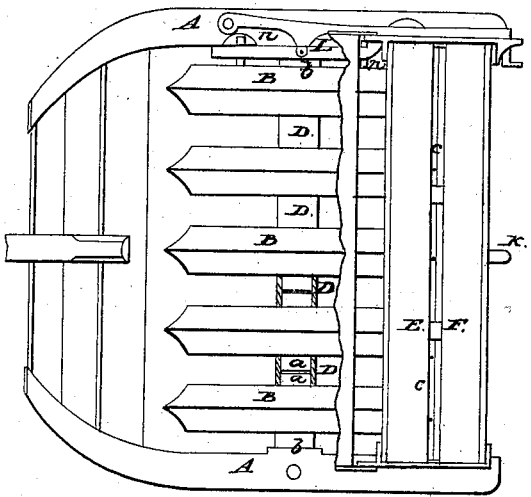
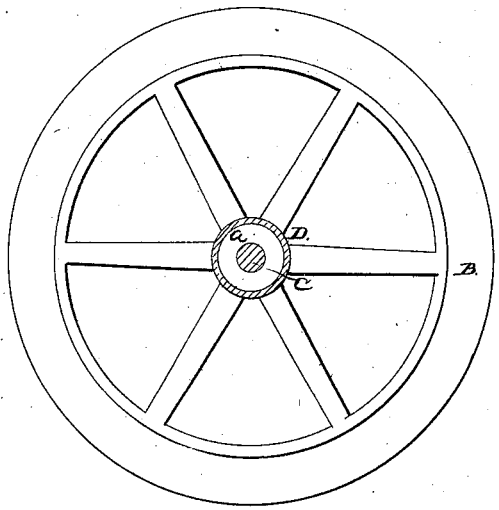
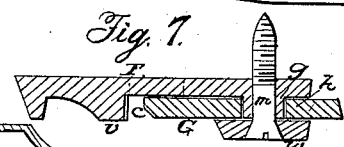
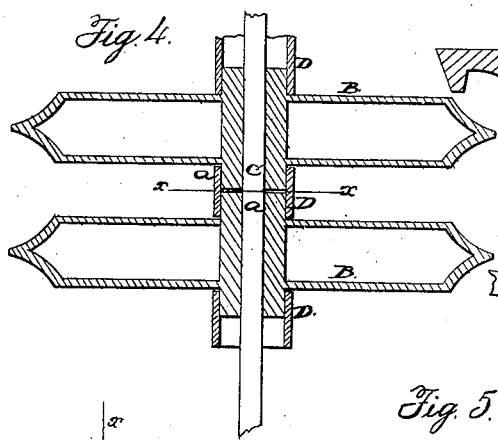
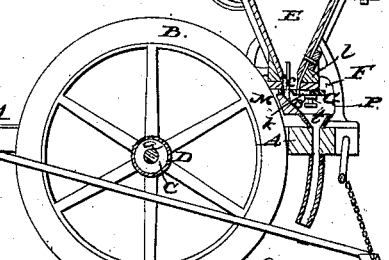
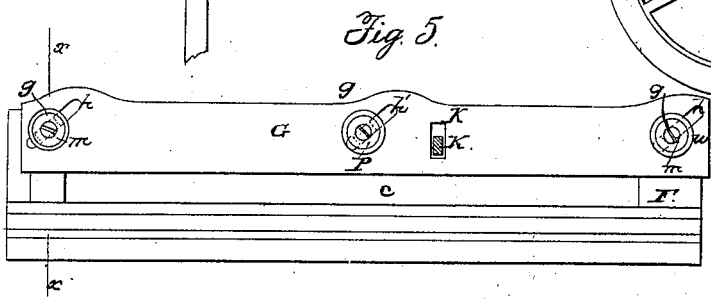
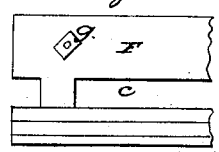

UNITED STATES PATENT OFFICE.

PHILO D. BECKWITH, OF DOWAGIAC, MICHIGAN.

IMPROVEMENT IN GRAIN-DRILLS.

Specification forming part of Letters Patent No. 40,597, dated November 17, 1863.

*To all whom it may concern:*

Be it known that I, PHILO D. BECKWITH, of Dowagiac, in the county of Cass and State of Michigan, have invented a new and useful Improvement in Seeding-Machines heretofore patented to myself; and I do hereby declare that the following is a full, clear, and exact description of the same, reference being had to the accompanying drawings, forming part of this specification, in which—

Figure 1 is a top view and partial section of a seeding-machine to which my improvements are particularly applicable, and in connection with which I have shown my improvements. Fig. 2 is a vertical longitudinal section of the same. Fig. 3 is a section through the roller-shaft, showing a cross-section of the shaft and of one of the tubular guards, the hub of the roller and the roller being in elevation. The section is in the line $x\,x$ of Fig. 4. Fig. 4 is a horizontal section through two of the rollers and two of the tubular guards. Fig. 5 is a top view of the two seed-distributing plates or bars. Fig. 6 is a top view of the bottom plate. Fig. 7 is a cross-section of the distributing device in the line $x\,x$ of Fig. 5.

Similar letters of reference in the several figures indicate corresponding parts.

The nature of my invention consists, first, in an improved device for guarding the bearings of the furrowing wheels or rollers of seeding-machines, so as to more thoroughly keep the loose dirt that rises on the peripheries of the wheels from falling between the hubs and passing into the bearings of the same, and thereby effect a great saving in the cost of keeping the machine in repair, and also reduce the power required to operate it.

My invention consists, second, in an improved device for regulating the discharge-aperture in the bottom of the seed box or hopper to different and uniform widths, which device is simpler and cheaper than other regulators in use of similar character.

To enable others skilled in the art to make and use my invention, I will proceed to describe the same with reference to the drawings.

A represents a frame adapted for the reception and support of all the mechanism of the seeding-machine. This frame is mounted on a series of rollers or wheels, B B, which are made of cast-iron. The periphery of each wheel tapers to an edge and presents the form of a V with concave sides. The hubs of the wheels extend an equal distance on each side from the faces of the wheels, as indicated at $a\,a$. The wheels are placed on a revolving shaft, C, which has its bearings or journals fitted in boxes $b\,b$ of the frame A.

All of the wheels, except one near the center of the shaft and another at one end of the shaft, are left loose, so as to revolve free of the shaft, those excepted being made fast, so as to revolve the shaft. The wheels are placed close enough together to have the extensions of one hub adjoin the extensions of other hubs, as shown. Before the wheels are placed on the shaft a tubular guard, D, of a length equal to the two adjoining extensions of each pair of hubs, is placed between every pair of wheels, and the hubs of the wheels slipped into the same, as represented; or, if preferred, a wheel may be placed on the shaft, then a guard slipped over the shaft upon the hub, and then another wheel placed on the shaft and its hub slipped into the guard, and so on until the full complement of wheels and guards has been applied.

It will be seen that both extensions of a pair of hubs are completely inclosed by a guard, and thus a complete protection of the bearing-surfaces of the hub and shaft against any falling dirt which may be carried up by the bevel peripheries of the wheels while the machine is in operation is effected. This is important, because if dirt gets between the hubs and the shaft much friction will be induced and considerable more power will be required to operate the machine, and, besides this, the machine will be liable to be deranged. The wheels serve to support the frame and working parts of the machine, and also to form furrows in the ground to receive the grain.

Attached to the frame of the machine, behind the wheels B B, is a hopper, E, for containing the seed or grain to be planted. On the bottom under side of this hopper is secured a metallic plate, F, which is fixed to the hopper, and may be called the "stationary" plate or jaw. Lengthwise through this plate is an oblong aperture or apertures, $c\,c$, of sufficient width to transmit the largest required seed and quantity of the same. Under this stationary plate, which has near its inner edge an under projecting rib or flange, $v$, there is a movable plate or jaw, G, arranged so as to come in contact with the thinner part thereof. This plate or jaw G is of such a thickness as to correspond with the increased thickness, v, on one side of the stationary plate or jaw, and thus the lower planes formed by the movable plate and the thick part v of the stationary plate correspond or form a continuation of one another. The thick part of this plate serves as one side of the opening or discharge-aperture and the thin part serves to close up the hopper-bottom, and to this latter part is secured the movable plate G, that serves for the other side of the discharge-aperture. There are projections g secured or cast on the under side of the stationary plate, which extend downward and fit into slots h h in the movable plate. These projections and slots are arranged at a suitable angle to the inner edge of this plate, as represented in the drawings.

The projections g g form guides for the movable plate to slide on, and they always keep the inner edge of this plate at an equal distance along its whole length from the inner edge of thick part v of the stationary plate, and while this parallelism is maintained the space between the inner edges of the thin plate and the thick plate may be varied as occasion demands. The projections being firmly secured on the stationary plate, they are not liable to be moved by any cause or in any case whatever, and therefore an unequal discharge of grain in different places at the same time cannot occur. The having of these projections fast on the plate will firmly and securely retain a uniform aperture between the plates—a thing of great importance in the sowing of seed.

The removable plate is secured upon the fixed projections by screw-bolts passing through the plates and projections, as indicated at m m, and thus by means of the large head or washer-plates w, which extend over the angular slots h in the movable plate, effectually hold the movable plate in position on the projections and against the stationary plate, whether this plate be set close to or out from the thick part or inner edge of the stationary plate. The opening or closing of the aperture between the plates to a greater or less extent is effected by a longitudinal motion of the movable plate, which motion is applied by means of a lever, K, placed at the side of the hopper or seed-box, the short arm of said lever extending down through an oblong longitudinal slot, l, in the stationary plate, and into an oblong transverse slot, k, in the movable plate, the slot k being made oblong to allow the transverse movement of the plate or jaw G.

A slide or rod, M, with pins on its upper surface reaching up between the two parallel plates, is made to vibrate through the seed in the hopper by means of a rocking lever, L, said lever having friction-rollers n n on it, and coming in contact with a cam-surface, as usual, on one of the wheels or rollers B, which are made fast on the axle or shaft of the machine.

By this arrangement the seed is agitated and caused to run out uniformly and freely.

It will be seen that by a simple and cheap means a device is produced that can be adjusted to the utmost degree of accuracy, and never by any cause can become deranged, except by naturally wearing out and hard usage.

The slide-rod M, above mentioned, has its upper surface inclined toward the back part of the machine, as at s, and thus forms a guide for the seed to be conducted down into converging hoppers t, from which the seed falls into tubes and then into the furrows.

O O represent a series of coverers, one of which follows each of the furrowing-wheels, and is attached on opposite sides and in front thereof by a bolt. Behind the hopper or seed-box is a crank-shaft with chains attached to it and to the coverers, by which means all the coverers may be simultaneously raised from the ground when turning or when transporting the machine to and from the field. The connection of the coverers to the crank-shaft is such that they are allowed to rise and fall independently of each other and of the crank-shaft when the latter is not raised or turned up.

A central set-bolt with large washer-plate, as indicated at P, may be used to confine the gage plate or jaw G in the different positions that it may be adjusted to. The oblique slot h', through which this set-bolt passes, may be fitted to a stationary projection, the same as the end slots previously described.

I would here state that the bolts of all the angular slots operate the best when passed through the projections; but I do not confine myself to thus passing them through the same, as they might be passed through the slots and the stationary plate at points to one side of the projections.

The operation is as follows: The hopper or seed-box is supplied with grain, and as the machine moves along over the field the wheels form the furrows and the stationary one gives a reciprocating motion to the agitating rod or bar, and thus causes it to feed the seed freely and uniformly out of the aperture in the bottom of the hopper into the tubes, and from the tubes into the furrows, which were formed by the wheels rolling over the ground and crushing the clods and forming a bed of pulverized earth for the seed. As fast as the seed is planted the earth is thrown loosely over it by the coverers, and it is left thus in a favorable condition for quick germination and for being protected from washing rains.

I do not claim broadly a distributing device wherein one of the plates composing it moves parallel toward or from the other by means of oblique slots and bolts; but

What I claim as my invention, and desire to secure by Letters Patent, is—

1. The arrangement of the fixed projections g g on the stationary plate or jaw F, in combination with the screw-bolts m, angular slots h h, and the movable plate or jaw G, substantially as herein described, and represented in the drawings, for the purpose set forth.

2. The combination of the tubular guards, rollers or wheels with extension-hubs, and the axle, substantially as and for the purposes set forth.

Witness my hand and seal in the matter of my application for Letters Patent on improved seeding-machines.

PHILO D. BECKWITH. [L. S.]

Witnesses:
 THOMAS J. GARDNER,
 STRAWTHER BOWLING.